(12) United States Patent
Yamanaka et al.

(10) Patent No.: US 9,030,140 B2
(45) Date of Patent: May 12, 2015

(54) IN-VEHICLE POWER SUPPLY SYSTEM WITH MULTIPLE VOLTAGE-REDUCING DEVICES

(71) Applicant: Denso Corporation, Kariya, Aichi-pref. (JP)

(72) Inventors: Takahiro Yamanaka, Kariya (JP); Toshihisa Yamamoto, Anjo (JP)

(73) Assignee: Denso Corporation, Kariya (JP)

( * ) Notice: Subject to any disclaimer, the term of this patent is extended or adjusted under 35 U.S.C. 154(b) by 122 days.

(21) Appl. No.: 13/796,478

(22) Filed: Mar. 12, 2013

(65) Prior Publication Data

US 2013/0234632 A1    Sep. 12, 2013

(30) Foreign Application Priority Data

Mar. 12, 2012 (JP) .................................. 2012-54177

(51) Int. Cl.
*H02P 27/00* (2006.01)
*B60R 16/03* (2006.01)

(52) U.S. Cl.
CPC ...................................... *B60R 16/03* (2013.01)

(58) Field of Classification Search
CPC ...... H02P 6/001; H02P 6/085; Y02T 10/7005
USPC ................... 318/400.3; 180/333, 315; 701/41
See application file for complete search history.

(56) References Cited

U.S. PATENT DOCUMENTS

| 7,970,514 B2 * | 6/2011 | Aeberhard et al. ............. 701/41 |
| 2003/0030328 A1 | 2/2003 | Tamai et al. |
| 2013/0090813 A1 | 4/2013 | Kanekawa et al. |

FOREIGN PATENT DOCUMENTS

| JP | 01-292493 | 11/1989 |
| JP | 2006-101565 | 4/2006 |
| JP | 2006-213273 | 8/2006 |
| JP | 2007-288846 | 11/2007 |
| JP | 2007-318920 | 12/2007 |
| JP | 2008-079447 | 4/2008 |
| JP | 2010-68583 | 3/2010 |

OTHER PUBLICATIONS

Office Action (2 pages) dated Mar. 4, 2014, issued in corresponding Japanese Application No. 2012-054177 and English translation (3 pages).

* cited by examiner

*Primary Examiner* — Karen Masih
(74) *Attorney, Agent, or Firm* — Nixon & Vanderhye PC

(57) ABSTRACT

An in-vehicle power supply system includes a DC power source, a steering power converter, a steering drive control unit, a plurality of voltage-reducing devices, and a voltage-reducing control unit. The steering power converter converts electric power supplied from the DC power source, and provides the electric power converted to a steering assist motor. The steering drive control unit is supplied with electric power from the DC power source, and controls the steering power converter. The voltage-reducing devices are coupled in parallel to each other between the DC power source and the steering power converter. Each of the voltage-reducing devices reduces a power source voltage of the DC power source and generates a reduced voltage when being operated. The voltage-reducing control unit determines operation state or non-operation state of each of the voltage-reducing devices such that at least one of the voltage-reducing devices is in operation at a time.

11 Claims, 14 Drawing Sheets

IN-VEHICLE POWER SUPPLY SYSTEM WITH MULTIPLE VOLTAGE-REDUCING DEVICES

CROSS REFERENCE TO RELATED APPLICATION

This application is based on Japanese Patent Application No. 2012-54177 filed on Mar. 12, 2012, the disclosure of which is incorporated herein by reference.

TECHNICAL FIELD

The present disclosure relates to an in-vehicle power supply system having multiple voltage-reducing devices.

BACKGROUND

Conventionally, a steering assist apparatus that assists steering of a vehicle by an assist torque generated by a steering assist motor has been known. The steering assist apparatus includes the steering assist motor, a power converter and a drive control unit. The power converter converts electric power supplied from a direct current (DC) power source and provides the converted electric power to the steering assist motor. The drive control unit controls the power converter. The power converter and the drive control unit are both driven with electric power supplied from the same power source.

In general, a voltage level required to drive the drive control unit is lower than a voltage level of the DC power source. Therefore, a voltage-reducing device is disposed between the DC power source and the drive control unit. The voltage supplied from the DC power source is reduced by the voltage-reducing device and provided to the drive control unit. In particular, such a voltage-reducing device is provided by a DC to DC converter having a switching power supply. For example, JP2007-318920A discloses a switching power supply apparatus that provides output voltages to separate loads through two channels.

Recently, in order to meet the requirement of improving reliability of the steering assist apparatus, "multiplex" or "redundancy" system has been proposed. in particular, it has been proposed to employ multiple power converters. In this case, even if one of or some of the power converters have malfunctions, the power converter that is in a normal condition can continue driving of the steering assist motor.

However, in a case where the steering assist apparatus has only one voltage-reducing device and an operation of the voltage-reducing device is stopped due to an increase in temperature of an element of the voltage-reducing device, the electric power supply to the drive control unit is stopped. As a result, the power converters are stopped. Namely, even if the multiple power converters are employed, the driving of the steering assist motor will be stopped.

It will be assumed a structure of providing voltages outputted from two-channels to a single load in the technology of JP2007-318920A. Further, it is considered to employ such a structure to voltage-reducing devices that outputs voltages to the drive control unit as the single load, thereby to implement multiplication of the voltage-reducing device.

However, a main cause of an abnormality of the voltage-reducing device is an increase in temperature of an element. When two voltage-reducing devices, which substantially have the same heat-resistant property, are operated for the same time period under the same heat dissipation environment, the temperature will increase similarly in the two-voltage-reducing devices. Namely, there is a possibility that, when the temperature of one of the voltage-reducing devices exceeds a limit, the temperature of the other of the voltage-reducing devices is at the same level as the one. Namely, when one of the voltage-reducing devices in an abnormal condition and its operation is stopped, the other of the voltage-reducing devices is simultaneously in an abnormal condition. Therefore, the other of the voltage-reducing devices does not function as a back-up device. As a result, the voltage-reducing devices cannot supply the electric power to the drive control unit, and the operations of the power converters are stopped. In such a case, the steering assist motor cannot generate the steering assist force, and hence a driver feels uncomfortable in steering the vehicle.

Even if the increase in temperature of the voltage-reducing device does not reach the limit and the operation of the voltage,-reducing device is not stopped, when the temperature of the voltage-reducing device increases close to the limit, power loss is likely to increase according to the switching operation. Namely, when the voltage-reducing devices are operated in a condition where the temperature of both of the two voltage-reducing devices is high, efficiency is reduced, resulting in an increase in power consumption.

SUMMARY

According to an aspect of the present disclosure, an in-vehicle power supply system includes a DC power source, an electric power converter, a steering drive control unit, a plurality of voltage-reducing devices, and, a voltage-reducing control unit. The electric power converter converts an electric power supplied from the DC power supply, and provides the converted electric power to a steering assist motor that assists steering of a vehicle. The steering drive control unit is supplied with an electric power from the DC power source. The steering drive control unit controls the electric power converter. The plurality of voltage-reducing devices is coupled in parallel to each other, between the DC power source and the steering drive control unit. The voltage-reducing device outputs a reduced voltage by reducing a power source voltage of the DC power source when the voltage-reducing device is operated. The voltage-reducing control unit determines an operation state or a non-operation state of each of the plurality of voltage-reducing devices such that at least one voltage-reducing device is in operation at a time.

In the in-vehicle power supply system according to the above-described aspect, the plurality of voltage-reducing devices is employed for the steering drive control unit as a load. Therefore, even if one of the voltage-reducing devices has an abnormality, the voltage-reducing control unit operates another voltage-reducing device that is in a normal condition. As such, an operation of the electric power converter and a driving of the steering assist motor can be continued. Further, the voltage-reducing control unit determines the operation state or the non-operation stale of the voltage-reducing devices such that at least one voltage-reducing device is in operation at a time. Namely, the voltage-reducing control unit determines the operation state or the non-operation state of the voltage-reducing devices such that all of the voltage-reducing devices are not stopped at the same time.

For example, the voltage-reducing control unit determines the operation state or the non-operation state of each of the voltage-reducing devices such that the temperature of all of the voltage-reducing devices does not reach a limit temperature at the same time. As such, it is less likely that all of the voltage-reducing devices will be inoperative at the same time.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, exemplary embodiments of the present disclosure will be described with reference to the drawings.

(First Embodiment)

An in-vehicle power supply system according to a first embodiment of the present disclosure will be described with reference to FIGS. 1 to 5.

The in-vehicle power supply system of the present disclosure is mounted in a vehicle, such as an electric vehicle and a hybrid vehicle. The in-vehicle power supply system supplies electric power to a main device that drives the vehicle to travel and to auxiliary devices that provide various functions of the vehicle other than the main device. In the present embodiment, the in-vehicle power supply system supplies electric power to a steering assist apparatus that assists steering of the vehicle, as an example of the auxiliary devices.

Figure 1:
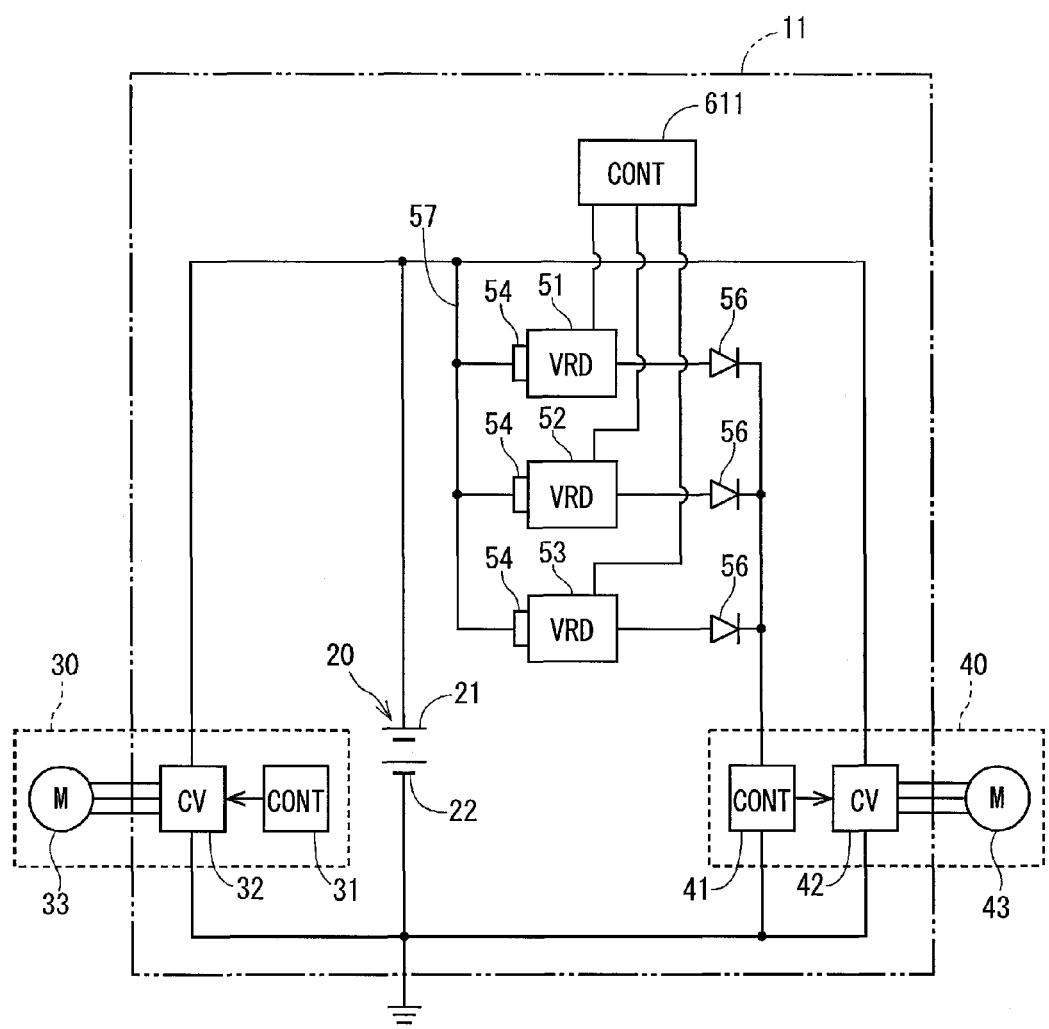
FIG. 1 is a schematic circuit diagram of an in-vehicle power supply system according to a first embodiment of the present disclosure.

Referring to FIG. 1, are in-vehicle power supply system 11 includes a main battery 20 as a DC power source, a main device drive control unit 31, a main device power converter 32, a steering drive control unit 41, a steering power converter 42, voltage-reducing devices 51, 52, 53, and a voltage-reducing control unit 611. The main device drive control unit 31 and the main device power converter 32 constitute a main device 30 of the vehicle. The steering drive control unit 41 and the steering power converter 42 constitute a steering assist apparatus 40.

The main device power converter 32 and the steering power converter 42 are coupled in parallel to the main battery 20. Each of the main device power converter 32 and the steering power converter 42 is supplied with electric power from the main battery 20. The main battery 20 has a high-potential electrode 21 and a low-potential electrode 22. A potential difference between the high-potential electrode 21 and the low-potential electrode 22 is, for example, 288 V.

The main device power converter 32 is controlled by the main device drive control unit 31. The main device power converter 32 converts the electric power supplied from the main battery 20, and provides the converted electric power to a main motor 33 that generates a driving force of the vehicle. A power supply route to the main device drive control unit 31 is not particularly limited. That is, the main device drive control unit 31 may be supplied with the electric power from the main battery 20, or may be supplied with electric power from any other power source.

The steering power converter 42 is controlled by the steering drive control unit 41. The steering power converter 42 converts the electric power supplied from the main battery 20, and provides the converted electric power to a steering assist motor 43 that assists the steering of the vehicle.

For example, the steering power converter 42 may be provided by a three-phase inverter. The steering assist motor 43 may be provided by a three-phase brushless motor. An output torque to the steering assist motor 43 is transmitted to a steering shaft (not shown) through a speed-reducing gear device or the like.

The steering power converter 42 may include multiple systems. Namely, the steering power converter 42 may be provided by a plurality of power converters. Since the plurality of power converters are employed, even if one of or some of the power converters have a malfunction, the other power converter(s) that is in a normal condition can keep to drive the steering assist motor 43.

A plurality of voltage-reducing devices (VRD) is disposed between the maim battery 20 and the steering drive control unit 41. The voltage-reducing devices reduce the power source voltage supplied from the main battery 20 to generate a reduced voltage of such as several volts. The reduced voltage is provided to the steering drive control unit 41. In the present embodiment, three voltage-reducing devices (VRD), such as a first voltage-reducing device 51, a second voltage-reducing device 52 and a third voltage-reducing device 53 are coupled in parallel to each other, between the main battery 20 and the steering drive control unit 41.

Each of the voltage-reducing devices 51, 52, 53 is a switching power supply provided by a DC-to-DC converter. The voltage-reducing devices 51, 52, 53 are coupled to a power line 57 through individual connectors 54, Respectively. The power line 57 is supplied with the electric power from the main battery 20. Diodes 56 are coupled to load-side terminals of the voltage-reducing devices 51, 52, 53, that is, to output terminals of the voltage-reducing devices 51, 52, 53 coupled to the steering drive control unit 41.

In general, a voltage level required to operate the steering drive control unit 41 is lower than a voltage level required to operate the steering power converter 42. Therefore, the steering drive control unit 41 is supplied with the reduced voltage, in place of being directly supplied with the power source voltage. In this case, a voltage-withstand specification of elements of the steering drive control unit 41 can be lowered. On the other hand, the steering power converter 42 may be directly supplied with the power source voltage. In this case, power loss due to a voltage reducing operation can be reduced.

The multiple voltage-reducing devices for supplying the reduced voltage to the steering drive control unit 41 are coupled in parallel to each other. Namely, a multiplex structure or a redundancy structure of the voltage-reducing device is implemented. In this case, even if one of or some of the voltage-reducing devices has a malfunction, the power supply to the steering drive control unit 41 can be maintained by a remaining voltage-reducing device that is in a normal condition.

In a case where multiple voltage-reducing devices having the same heat resistance property are simply arranged and operated for the same time period under the same heat dissipation environment, the temperature increases in the same manner between the multiple voltage-reducing devices. In this case, an abnormality is likely to occur at the substantially same time between the multiple voltage-reducing devices. As a result, the power supply to the steering drive control unit 41 cannot be continued, and the driving of the steering assist motor 43 is stopped. In such a case, the steering assist torque will not be generated, and the driver will feel inconvenience in a steering operation.

In the present embodiment, to avoid such a situation, the voltage-reducing control unit 611 determines an operation state or a non-operation state of each of the voltage-reducing devices 51, 52, 53 such that at least one of the voltage-reducing devices 51, 52, 53 is operated at a time.

The voltage-reducing control unit 611 will be described with reference to FIGS. 2 to 5.

Figure 2:
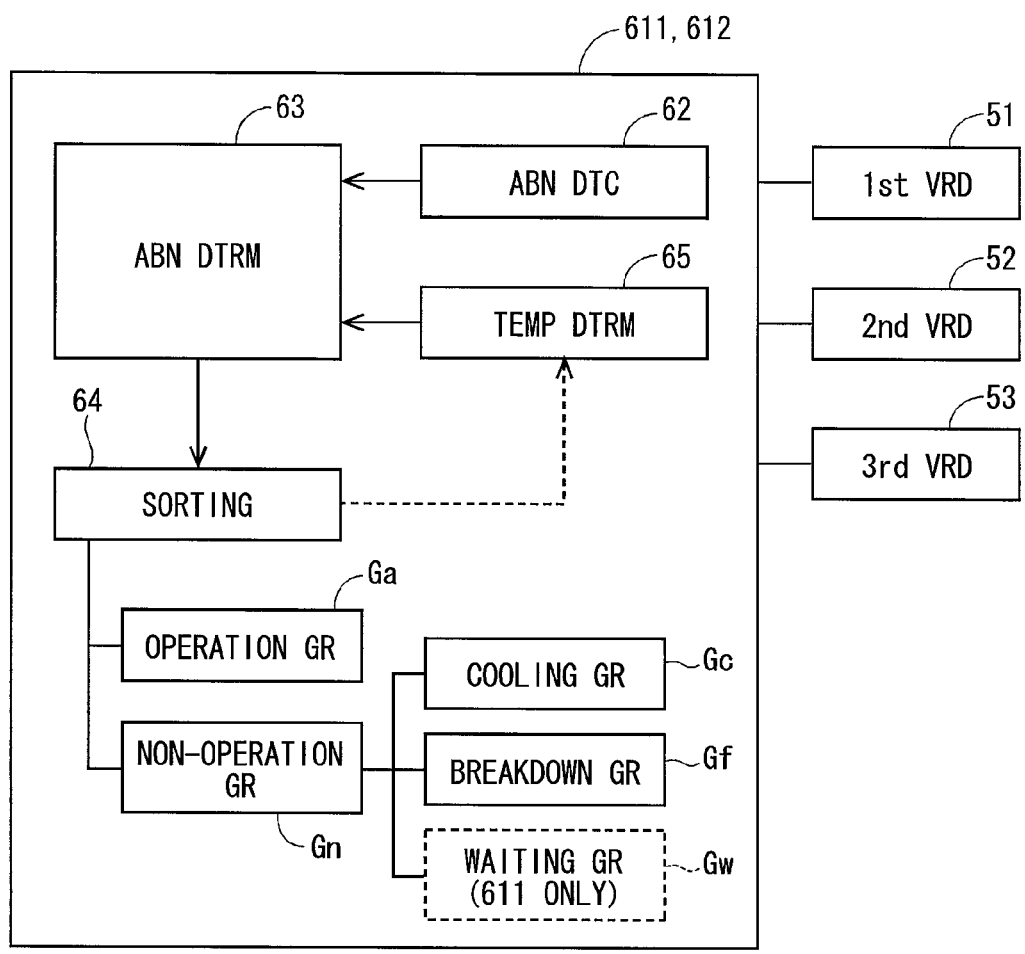
FIG. 2 is a schematic block diagram of a voltage-reducing control unit of the in-vehicle power supply system according to the first embodiment.

As shown in FIG. 2, the voltage-reducing control unit 611 includes an abnormality detection section 62, an abnormality determination section 63, a sorting section 64, and a temperature determination section 65.

The abnormality detection section 62 detects an abnormality of the voltage-reducing devices 51, 52, 53. The abnormality of the voltage-reducing device includes an abnormality due to temperature increase (hereinafter, simply referred to as the temperature increase abnormality), and an abnormality due to breakdown, such as disconnection or short-circuit of a switching element of the voltage-reducing device (hereinafter, simply referred to as the breakdown abnormality).

The temperature increase abnormality means a condition where the temperature reaches a predetermined limit temperature due to heat generation according to operation of the switching element and the like. Also, the temperature increase abnormality corresponds to a condition that results in malfunction or breakdown of the element if the operation of the voltage-reducing device is continued. In the temperature increase abnormality, if the operation of the voltage-reducing device is immediately stopped when the temperature reaches the limit temperature and the voltage-reducing device is cooled down, the voltage-reducing device is likely to return to the normal condition. Namely, the temperature increase abnormality is not a crucial fault, but is a condition where the operation of the voltage-reducing device should be temporality limited. Therefore, the limit temperature is set to a temperature lower than a temperature at which the element is completely broken, such that the voltage-reducing device can return to the normal condition when being cooled.

On the other hand, the breakdown abnormality is a condition where the element is broken and does not work again. The breakdown is likely to occur when the voltage-reducing device is continuously used after the temperature exceeds the limit temperature, when an excess voltage, such as a surge voltage, is applied to the element, or when the element is affected by an external force, such as vibration and impact.

The abnormality determination section 63 determines whether the abnormality of the voltage-reducing device that has been detected by the abnormality detection section 62 is the temperature increase abnormality or the breakdown abnormality.

The sorting section 64 sorts each of the voltage-reducing devices 51, 52, 53 into an operation group Ga and a non-operation group Gn based on the detection result of the abnormality detection section 62 and the determination result of the abnormality determination section 63. In the present embodiment, the non-operation group Gn is further classified into a cooling group Gc, breakdown group Gf, and a waiting (standby) group Gw. Namely, four group categories are defined for sorting the voltage-reducing devices.

The voltage-reducing device that is in a normal condition and in operation belongs to the operation group Ga. The voltage-reducing device that is not in operation due to the temperature increase abnormality and is being cooled to be returned to the normal condition belongs to the cooling group Gc. The voltage-reducing device that has lost its function and does not work again belongs to the breakdown group Gf. The voltage-reducing device that is in the normal condition, but is not in operation belongs to the waiting group Gw. In the following description, the reference numeral of each group, such as Ga, Gn, Gc, Gf, Gw, is omitted.

The temperature determination section 65 detects the temperature of the voltage-reducing device of the cooling group with time, and determines whether the temperature of the voltage-reducing device of the cooling group reduces equal to or lower than an allowance threshold temperature to determine whether to allow an operation. The sorting section 64 changes the group category of the voltage-reducing device whose temperature has been reduced equal to or lower than the allowance threshold temperature from the cooling group to the waiting group.

Next, a voltage-reducing control of the first embodiment will be described with reference to flowcharts of FIGS. 3 and 4.

In the voltage-reducing control, an operation state or a non-operation state of each of the voltage-reducing devices is determined such that at least one of the voltage-reducing devices is operated at a time. In the first embodiment, one operative voltage-reducing device is selected and operated at a time. Namely, the voltage-reducing devices that are operative are operated alternately. In the drawings, IG represents an ignition switch, and GR represents a group.

Figure 3:
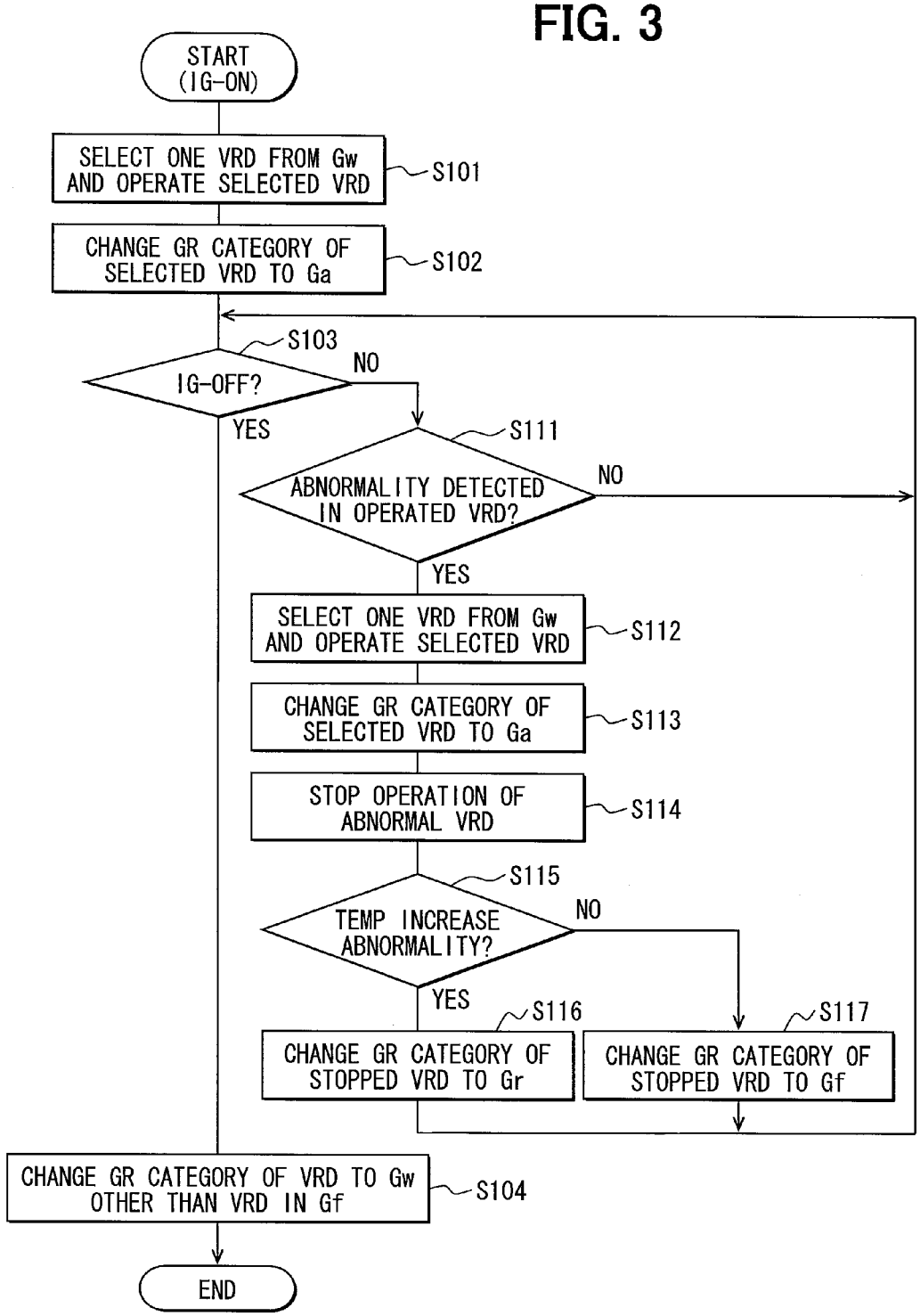
FIG. 3 is a diagram illustrating a flowchart of a main process of a voltage-reducing control performed by the voltage-reducing control unit according to the first embodiment.
Figure 4:
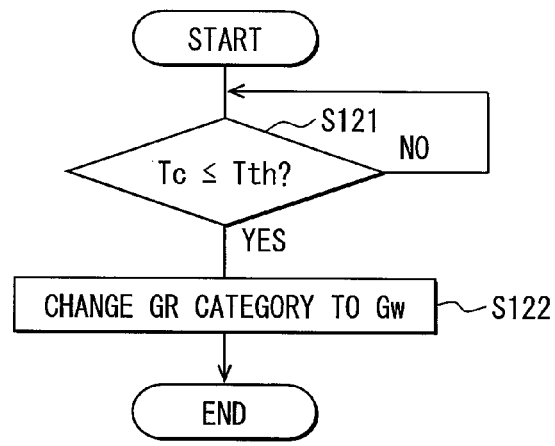
FIG. 4 is a diagram illustrating a flowchart of a sub-process of the voltage-reducing control according to the first embodiment.

Referring to FIG. 3, the voltage-reducing control begins when the ignition switch IG is turned on. After the ignition switch is turned on, the sorting section 64 selects one voltage-reducing device from the waiting group and operates the selected voltage-reducing device (S101). The sorting section 64 changes the group category of the voltage-reducing device selected and operated to the operation group (S102). Hereinafter, a process of changing the group category of the voltage-reducing device is performed by the sorting section 64.

Thereafter, until the ignition switch is turned off, that is, while the ignition is on (S103: NO), a determination of the abnormality detection of S111 is repeated. At S111, it is determined whether the abnormality detection section 62 has detected an abnormality in the voltage-reducing device that is in operation.

When it is determined that the abnormality detection section 62 has detected the abnormality of the voltage-reducing device that is in operation (S111: YES), another voltage-reducing device is selected from the waiting group and is operated (S112). Also, the group category of the voltage-reducing device selected and operated is changed to the operation group (S113). The operation of the voltage-reducing device that has been detected as being in the abnormal condition is stopped (S114). Thus, the switching of the voltage-reducing device to be operated finishes.

At S115, the group category of the voltage-reducing device that has stopped its operation is determined. Namely, when the abnormality determination section 63 determines that the abnormality of the stopped voltage-reducing device is the temperature increase abnormality (S115: YES), the sorting section 64 changes the group category of the stopped voltage-reducing device from the operation group to the cooling group (S116).

When the abnormality determination section 63 determines that the abnormality of the stopped voltage-reducing device is not the temperature increase abnormality (S115: NO), the sorting section 64 changes the group category of the stopped voltage-reducing device from the operation group to the breakdown group (S117).

With regard to the voltage-reducing device that has been changed to the cooling group at S115, the temperature determination section 65 thereafter detects the temperature with time. As shown in FIG. 4, in a sub-process for the voltage-reducing device in the cooling group, when the temperature Tc of the voltage-reducing device reduces equal to or lower than the allowance threshold temperature Tth (S121 YES), the group category of the voltage-reducing device is changed from the cooling group to the waiting group (S122). Namely, it is determined that a temporary abnormality of the voltage-reducing device due to the temperature increase is solved and the voltage-reducing device is normally operative again.

Returning to FIG. 3, when the ignition switch is turned off (S103: YES), the operation of all the voltage-reducing devices is stopped, and the entirety of the steering assist apparatus 40 is stopped. In this case, the group categories of the voltage-reducing devices, other than the voltage-reducing device(s) belonging to the breakdown group, are changed to the waiting group at S104. Namely, the group categories of the voltage-reducing devices belonging to the operation group, the cooling group or the waiting group are changed to the waiting group at S104. Then, the voltage-reducing control is finished. As such, when the ignition switch is turned on next time, the voltage-reducing devices other than the voltage-reducing device belonging to the breakdown group are treated as normally operative devices.

Figure 5:
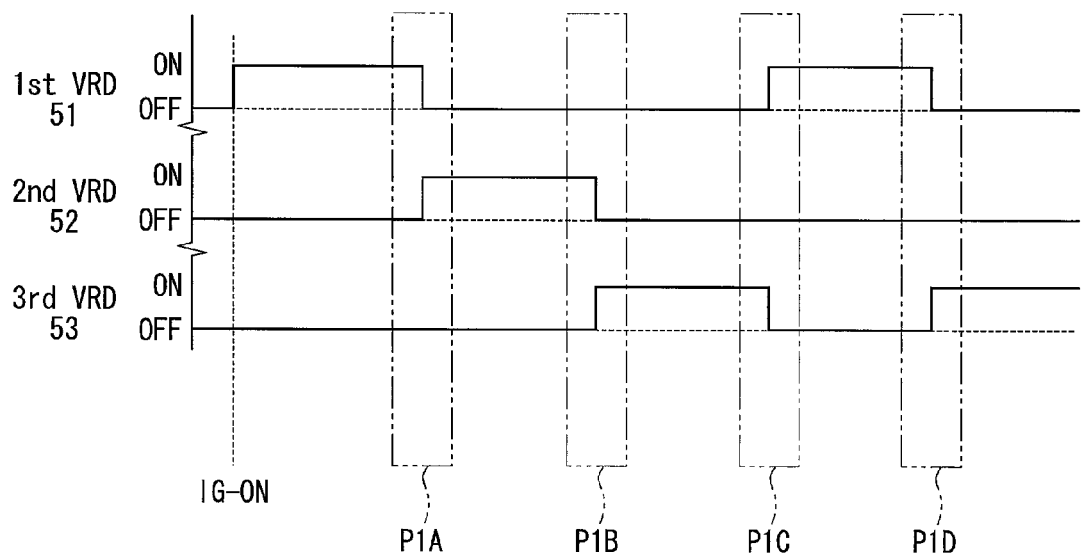
FIG. 5 is a diagram illustrating a time chart of operation states of voltage-reducing devices in the voltage-reducing control process according to the first embodiment.

FIG. 5 is a diagram illustrating a time chart of operation and non-operation states of the voltage-reducing devices controlled by the voltage-reducing control of the first embodiment, as an example. In the time chart, "ON" indicates that the voltage-reducing device is in operation, and "OFF" indicates that the voltage-reducing device is not in operation, that is, in stopped state.

In the example of FIG. 5, when the ignition switch is turned on, the first voltage-reducing device 51 is selected and begins its operation. The second voltage-reducing device 52 and the third voltage-reducing device 53 belong to the waiting group.

At a time P1A, an abnormality is detected in the first voltage-reducing device 51, and the operation of the first voltage-reducing device 51 is stopped. At the same time, the second voltage-reducing device 52 is changed from the waiting group to the operation group, and begins its operation. Also, the abnormality of the first voltage-reducing device 51 is determined as the temperature increase abnormality, and the group category of the first-voltage reducing device 51 is changed to the cooling group.

At a time P1B, an abnormality is detected in the second voltage-reducing device 52, and the operation of the second voltage-reducing device 52 is stopped. At the same time, the third voltage-reducing device 53 is changed from the waiting group to the operation group and begins its operation. The abnormality of the second voltage-reducing device 52 is determined as the breakdown abnormality, such as a failure due to a disconnection of an element or a short-circuit other than the temperature increase abnormality. Thus, the group category of the second voltage-reducing device 52 is changed to the breakdown group. Therefore, the second voltage-reducing device 52 is not operated again.

During a period from the time P1B to a time P1C, the temperature of the first voltage-reducing device 51 reduces equal to or lower than the allowance threshold temperature. Thus, the first voltage-reducing device 51 is changed from the cooling group to the waiting group.

At the time P1C, an abnormality is detected in the third voltage-reducing device 53, and the operation of the third voltage-reducing device 53 is stopped. At the same time, the first voltage-reducing device 51 is changed from the waiting group to the operation group, and begins its operation. Also, the abnormality of the third voltage-reducing device 53 is determined as the temperature increase abnormality, and the third voltage-reducing device 53 is changed to the cooling group.

During a period from the time P1C to a time P1D, the temperature of the third voltage-reducing device 53 reduces equal to or lower than the allowance threshold temperature. Thus, the third voltage-reducing device 53 is changed from the cooling group to the waiting group.

At the time P1D, an abnormality is detected in the first voltage-reducing device 51, and the operation of the first voltage-reducing device 51 is stopped. At the same time, the third voltage-reducing device 53 is changed from the waiting group to the operation group, and begins its operation. Also, the abnormality of the first voltage-reducing device 51 is determined as the temperature increase abnormality, and the first voltage-reducing device 51 is changed to the cooling device.

Thereafter, the first voltage-reducing device 51 and the third voltage-reducing device 53 are alternately operated.

In the first embodiment described above, one voltage-reducing device that does not belong to the breakdown group is operated until an abnormality is detected in the one. When the abnormality is detected in the one, the operation of the one is stopped, and another voltage-reducing device belonging to the waiting group is operated in turn. The voltage-reducing device that has been determined as having the temperature increase abnormality and has stopped its operation is cooled so as to recover its function.

As such, it is less likely that all of the voltage-reducing devices 51, 52, 53 will be inoperative at the same time. Accordingly, the steering drive control unit 41 of the steering assist apparatus 40 can continue its operation. With this, the steering assist torque is securely obtained in the steering. Reliability of the steering assist apparatus 40 improves.

Before the voltage-reducing device 51, 52, 53 becomes inoperative, the voltage-reducing devices that are recovered to the normally operative condition by cooling are operated in turn. Therefore, power loss due to the temperature increase is reduced, and efficiency of the voltage-reducing devices 51, 52, 53 improves.

In-vehicle power supply systems according to second to fourth embodiments will be hereinafter described. In the second to fourth embodiments, a structure of a voltage-reducing control unit and a voltage-reducing control method are different from those of the first embodiment. Hereinafter, like parts are designated with like reference numerals, and a description thereof will not be repeated.

(Second Embodiment)

A voltage-reducing control unit 612 of the second embodiment will be described with reference to FIGS. 6 to 8.

A structure of the voltage-reducing control unit 612 of the second embodiment is substantially similar to the voltage-reducing control unit 611 of the first embodiment shown in FIG. 2, except for the group categories of the voltage-reducing devices. Namely, in the second embodiment, the voltage-reducing devices are categorized into three groups, such as the "operation group", the "cooling group", and the "breakdown croup". The "waiting group", which is included in the first embodiment, is not included in the second embodiment. Namely, the "non-operation group" of the second embodiment only includes the "cooling group" and the "breakdown group".

In the second embodiment, the voltage-reducing devices, excluding the voltage-reducing device having the breakdown abnormality and the voltage-reducing device being in a cooling state, are all operated without being waited.

Figure 6:
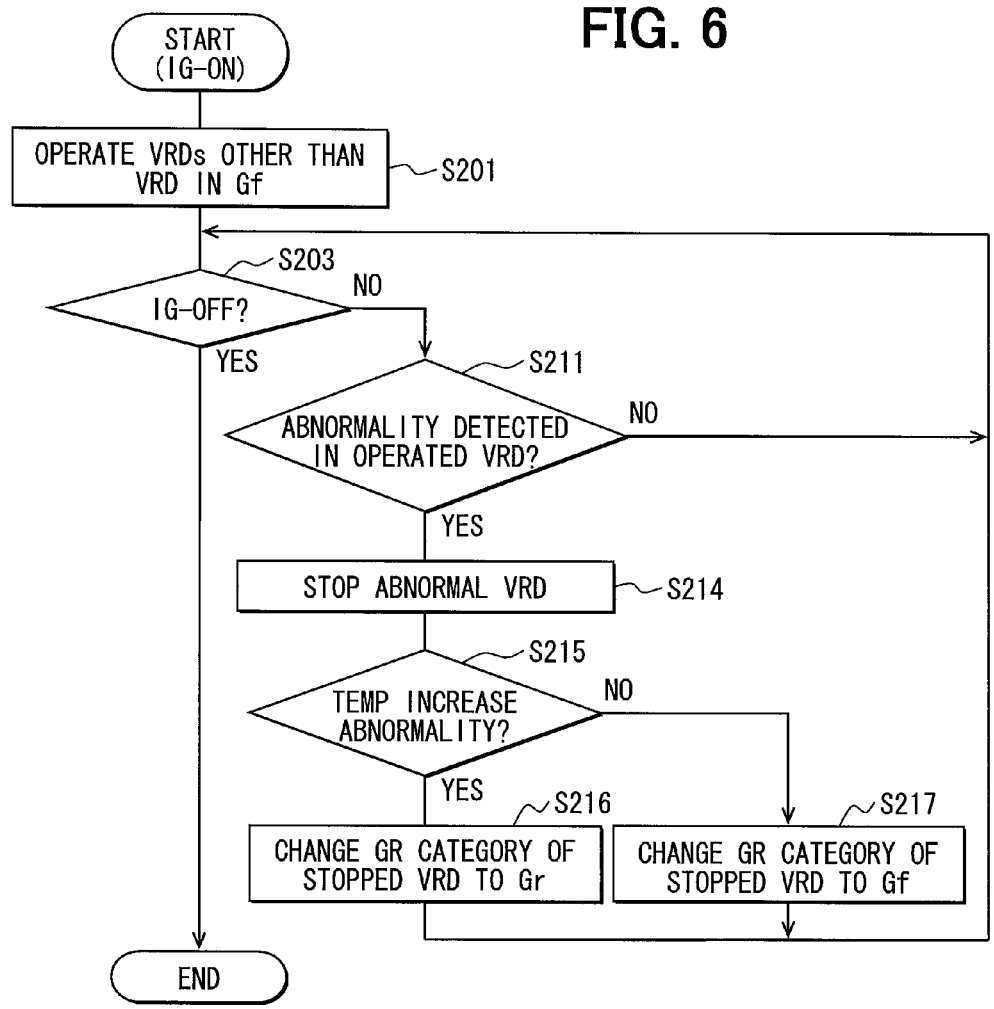
FIG. 6 is a diagram illustrating a flowchart of a main process of a voltage-reducing control performed by a voltage-reducing control unit of an in-vehicle power supply system according to a second embodiment.
Figure 7:
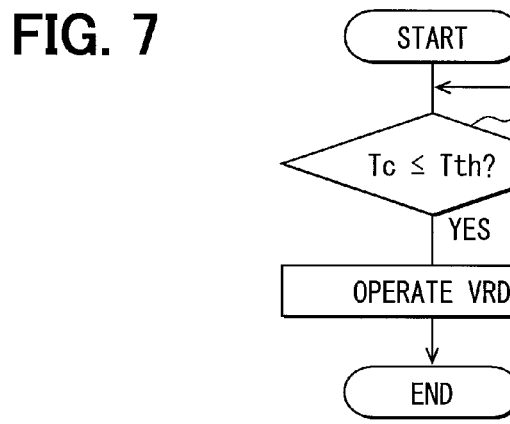
FIG. 7 is a diagram illustrating a flowchart of a sub-process, regarding a cooling group, of the voltage-reducing control according to the second embodiment.

As shown in a flowchart of FIG. 6, after the ignition switch is turned on, the voltage-reducing control unit 612 operates all of the voltage-reducing devices other than the voltage-reducing device that has been changed to the breakdown group in a previous voltage-reducing control at S201. Thereafter, while the ignition switch is on (S203: NO), a determination of the abnormality detection at S211 is repeated.

At S211, it is determined whether the abnormality detection section 62 has detected an abnormality in the voltage-reducing devices that are in operation. When it is determined that the abnormality detection section 62 has detected the abnormality in the voltage reducing device that is in operation (S211: YES), the operation of the voltage-reducing device that has been detected as having the abnormality is stopped (S214).

A subsequent process from S215 to S216 and, a subsequent process from S215 to S217 for determining and changing the group category of the voltage-reducing device that has stopped its operation are performed in a similar manner to that of the first embodiment. Namely, at S215, the temperature determination section 63 determines whether the abnormality of the stopped voltage-reducing device is the temperature increase abnormality.

When the abnormality of the stopped voltage-reducing device is determined as the temperature increase abnormality (S215: YES), the sorting section 64 changes the group category of the stopped voltage-reducing device from the operation group to the cooling group at S216. When the abnormality of the stopped voltage-reducing device is deter mined as the breakdown abnormality (S215: NO), the sorting section 64 changes the group category of the stopped voltage-educing device from the operation group to the breakdown group at S217.

With regard to the voltage-reducing device that has been changed to the cooling group at S216, the temperature determination section 65 thereafter detects the temperature with time. As shown in FIG. 7, in a sub-process regarding the voltage-reducing device in the cooling group, when the temperature To of the voltage-reducing device reduces equal to or lower than the allowance threshold temperature Tth (S221: YES), the voltage-reducing device is operated (S222). Namely, the voltage-reducing device that has been cooled is operated immediately after being recovered to the operative condition. In other words, the cooled voltage-reducing device is operated without being changed to the waiting group once as the first embodiment.

When the ignition switch is turned off (S203: YES), the voltage-reducing control is finished without changing the group categories of the operative voltage-reducing devices to the waiting group.

Figure 8:
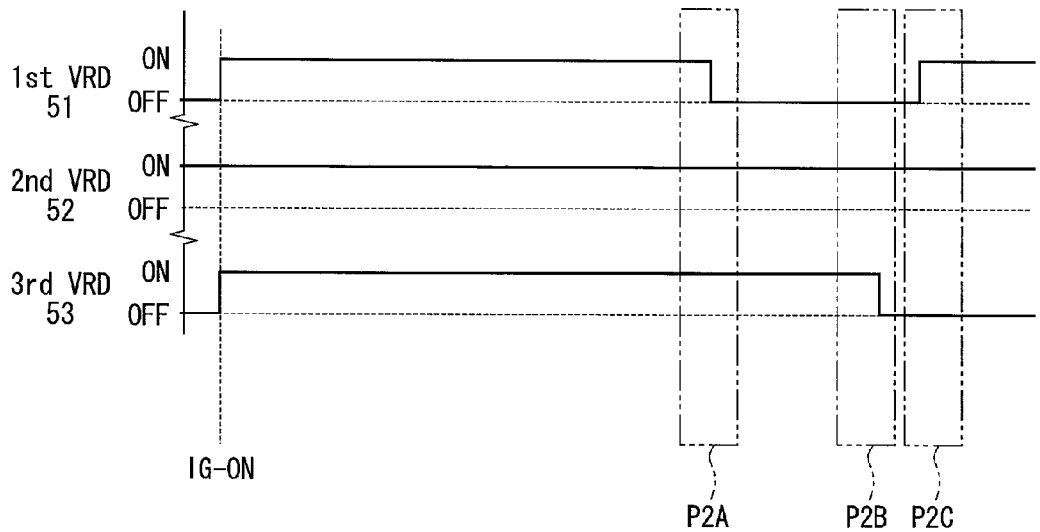
FIG. 8 is a diagram illustrating a time chart of operation states of voltage-reducing devices in the voltage-reducing control according to the second embodiment.

FIG. 8 is a diagram illustrating a time chart of operation and non-operation states of the voltage-reducing devices controlled by the voltage-reducing control of the second embodiment, as an example.

When the ignition switch is turned on, all of the voltage-reducing devices 51, 52, 53 begins operation.

At a time P2A, an abnormality is detected in the first-voltage detecting device 51, and the operation of the first voltage-reducing device 51 is stopped. The abnormality of the first voltage-detecting device 51 is determined as the temperature increase abnormality, and the first voltage-reducing device 51 is changed to the cooling group.

At a time P2B, an abnormality is detected in the third voltage-reducing device 53, and the operation of the third-voltage reducing device 53 is stopped. Further, the abnormality of the third voltage reducing device 53 is determined as the breakdown abnormality, such as a failure due to a disconnection of an element or a short-circuit other than the temperature increase abnormality, and the third voltage-reducing device 53 is changed to the breakdown group.

At a time P2C, the temperature of the first voltage-reducing device 51 reduces equal to or lower than the allowance threshold temperature, and the first voltage-reducing device 51 is changed from the cooling group to the operation group. The first voltage-reducing device 51 begins its operation.

In the voltage-reducing control according to the second embodiment, all of the voltage-reducing devices, which are in the normal condition and do not belong to the breakdown group, are operated. Further, when an abnormality is detected in the voltage-detecting devices, the operation of the voltage-reducing device having the abnormality is stopped.

The voltage-reducing device that has been detected as having the temperature increase abnormality is stopped and cooled to recover its function. Therefore, similar to the first embodiment, the steering drive control unit 41 can continue its operation, and the reliability of the steering assist apparatus 40 improves. Further, the efficiency of the voltage-reducing device improves.

(Third Embodiment)

A voltage-reducing control unit 613 of the third embodiment will be described with reference to FIGS. 9 to 12.

In the voltage-reducing controls of the third embodiment and the fourth embodiment, the voltage-reducing devices that are not broken down are operated, but are stopped alternately. The voltage-reducing controls of the first and second embodiments described above are based on an abnormality maintenance idea in which the voltage-reducing device is operated until an abnormality occurs, and is stopped when the abnormality is detected. On the other hand, the voltage-reducing controls of the third and fourth embodiments described hereinafter are based on a preventive maintenance idea in which the voltage-reducing device is stopped for a predetermined period of time to restrict the increase in temperature before an abnormality occurs in the voltage-reducing device. For example, one of the voltage-reducing devices is selected and is stopped for the predetermined period of time.

In the third embodiment, as a method of selecting the voltage-reducing device to be stopped, the voltage-reducing device having the highest temperature is selected from the voltage-reducing devices that are not broken down.

Figure 9:
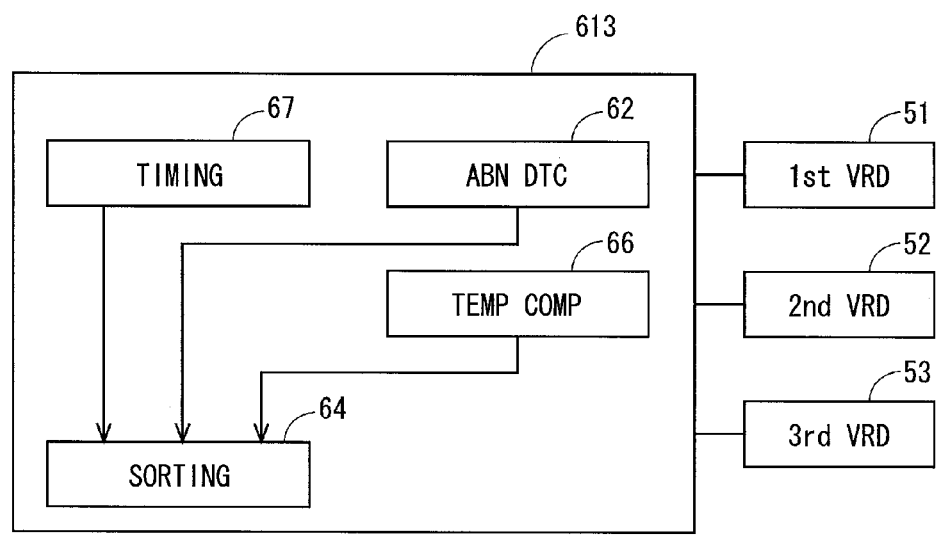
FIG. 9 is a schematic block diagram of a voltage-reducing control unit of an in-vehicle power supply system according to a third embodiment of the present disclosure.

In particular, the voltage-reducing control unit 613 includes the normality detection section 62, a temperature comparing section 66, a timing section 67, and the sorting section 64, as shown in FIG. 9.

Figure 10:
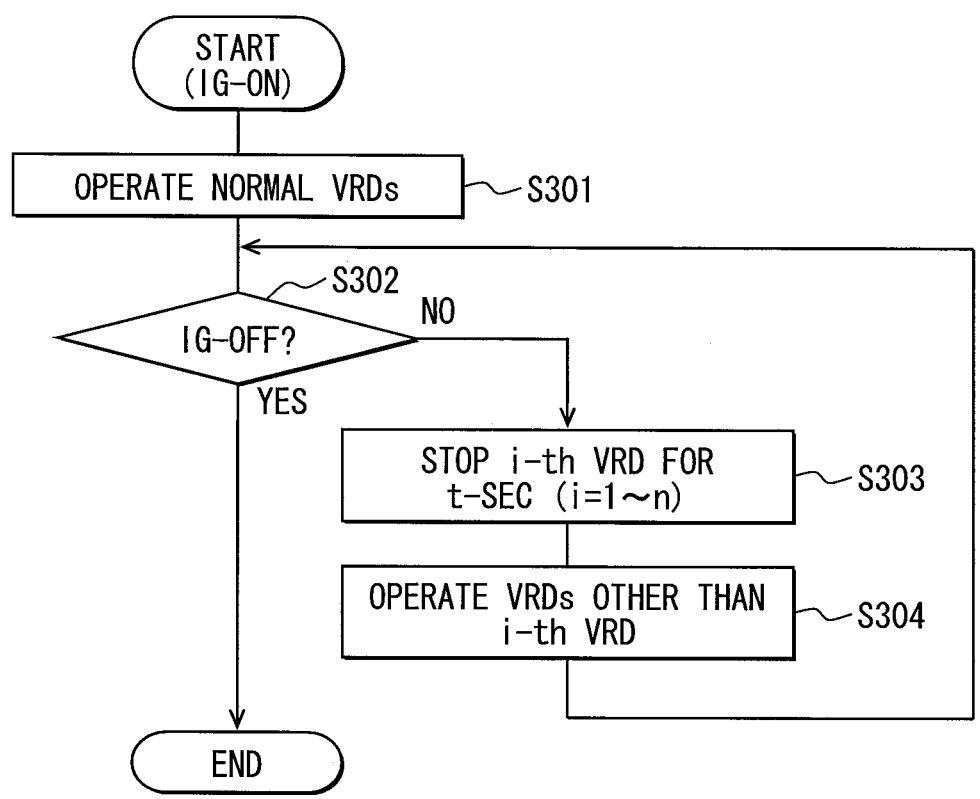
FIG. 10 is a diagram illustrating a flowchart of a main process of a voltage-reducing control performed by the voltage-reducing control unit according to the third embodiment.

As shown in a flowchart of FIG. 10, at S301 after the ignition switch is turned on, the voltage-reducing control unit 613 operates N number of voltage-reducing devices excluding the voltage-reducing device that has been detected as having an abnormality by the abnormality detecting section 62. Thereafter, while the ignition switch is on (S302: NO), among the N number of voltage-reducing devices, an operation of one voltage voltage-reducing device is stopped for a time period t (e.g., t seconds) by the timing section 67 (S303), and the other voltage-reducing devices are operated (S304). Here, the voltage-reducing device whose operation is to be stopped is referred to as the i-th voltage-reducing device.

Figure 11:
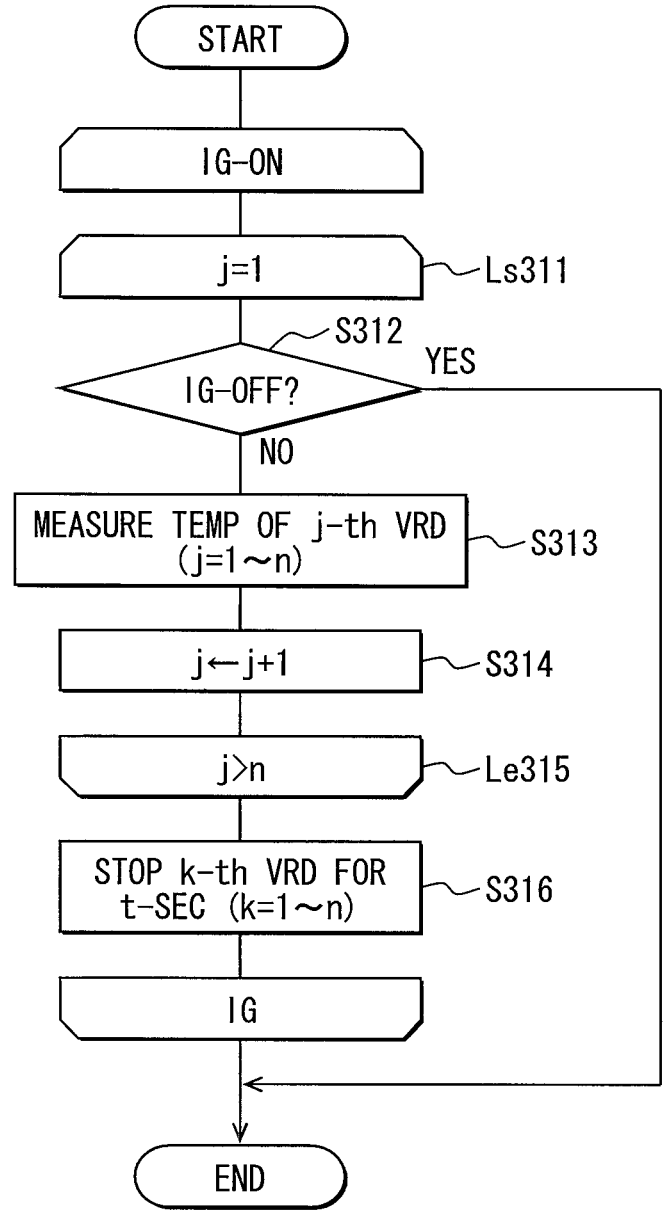
FIG. 11 is a diagram illustrating a flowchart of a sub-process of the voltage-reducing control according to the third embodiment.

In the third embodiment, the i-th voltage reducing device is selected by a sub-process shown in FIG. 11.

Referring to FIG. 11, after the ignition switch is turned on and while the ignition switch is on (S312: NO), in a process from a loop start Ls311 where "j=1" to a loop end Le315 where "j>n", the temperature comparing section 66 successively measures the temperature of a j-th voltage-reducing device (S313, S314). The temperature comparing section 66 compares the measured temperatures of the N number of voltage-reducing devices, and finds a k-th voltage-detecting device having the highest temperature. In this case, the sorting section 64 selects the k-th voltage-reducing device as the i-th voltage reducing device to be stopped, and stops the operation of the k-th voltage reducing device for the predetermined time period t (S316).

Figure 12:
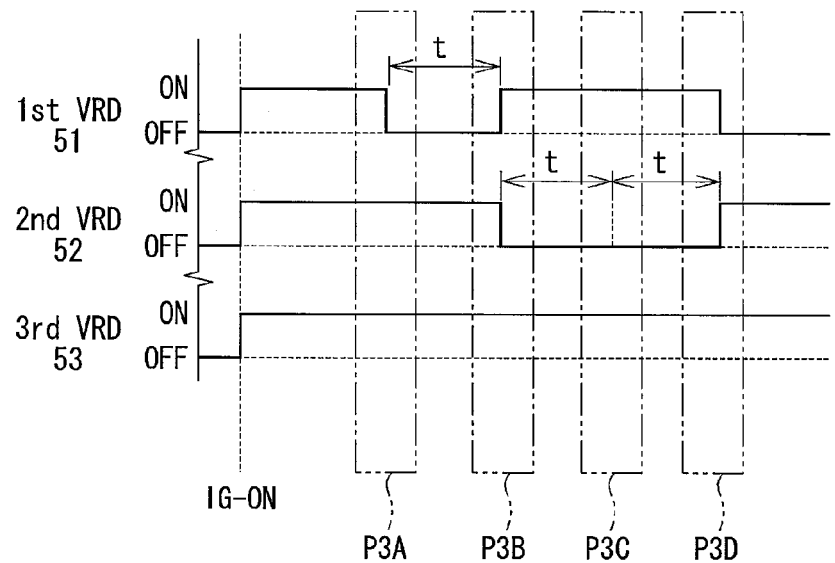
FIG. 12 is a diagram illustrating a time chart of operation states of voltage-reducing devices in the voltage-reducing control according to the third embodiment.

FIG. 12 is a diagram illustrating a time chart of operation and non-operation states of the voltage-reducing devices controlled by the voltage-reducing control of the third embodiment, as an example.

When the ignition switch is turned or all of the three voltage-reducing devices 51, 52, 53 begins operation. At a time P3A, the temperatures of the voltage-reducing devices are compared to each other, and the operation of the first voltage-reducing device 51 having the highest temperature is stopped for the time period t.

At a time P3B, the temperatures of the voltage-reducing devices are compared to each other, and the operation of the second voltage-reducing device 52 having the highest temperature is stopped for the time period t. Also, the operation of the first voltage-reducing device 51, which has been stopped, is restarted.

At a time P3C, the temperature of the second voltage-reducing device 52 is still the highest. Therefore, the operation of the second voltage-reducing device 52 is stopped for another time period t.

At a time P3D, the operation of the first voltage-reducing device 51 having the highest temperature is stopped for the time period t, and the operation of the second voltage-reducing device 52, which has been stopped, is restarted.

In the third embodiment described above, after the ignition switch is turned on the temperatures of all of the voltage-reducing devices are compared at an interval t, that is, every time period t. The operation of the voltage-reducing device having the highest temperature at that time is stopped. Therefore, the increase in temperature of the voltage-reducing devices can be restricted, before the temperature reaches the allowance threshold temperature and an abnormality occurs in the voltage-reducing devices.

Accordingly, similar to the embodiments described above, the reliability of the steering assist apparatus 40 improves. Also, the efficiency of the voltage-reducing devices improves.

(Fourth Embodiment)

A voltage-reducing control unit 614 of the fourth embodiment will be described with reference to FIGS. 13 to 15.

Figure 13:
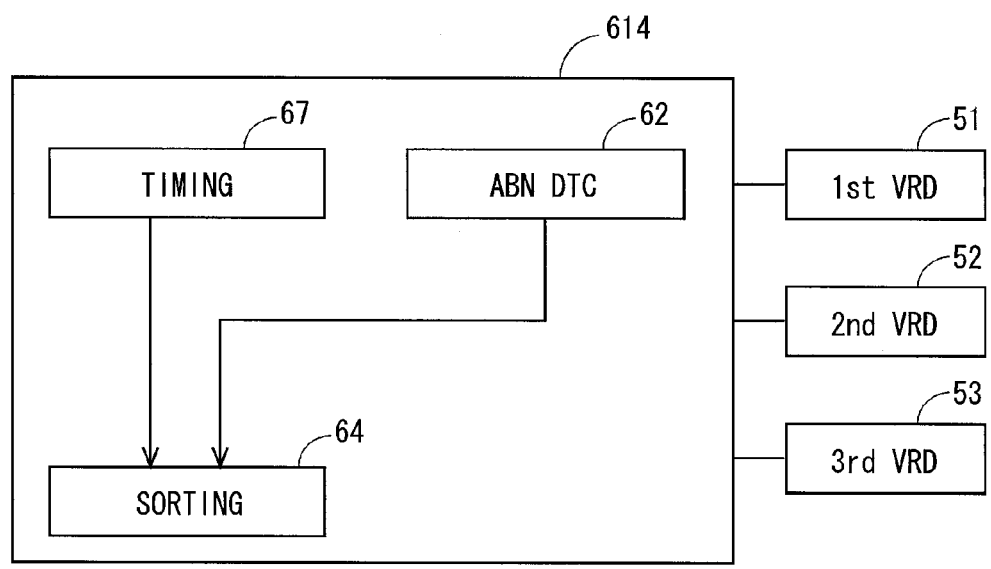
FIG. 13 is a schematic block diagram of a voltage-reducing control unit of an in-vehicle power supply system according to a fourth embodiment of the present disclosure.

As shown in FIG. 13, the voltage-reducing control unit 614 includes the abnormality detection section 62, the timing section 67 and the sorting section 64, similar to the voltage-reducing control unit 613 of the third embodiment, but does not include the temperature comparing section 66.

In the voltage-reducing control unit 614 of the fourth embodiment, the flowchart of FIG. 10 of the third embodiment is incorporated. Namely, the voltage-reducing control unit 614 performs the voltage-reducing control shown in FIG. 10. In the fourth embodiment, however, the i-th voltage-reducing device to be stopped is selected by a sub-process shown in FIG. 14.

Figure 14:
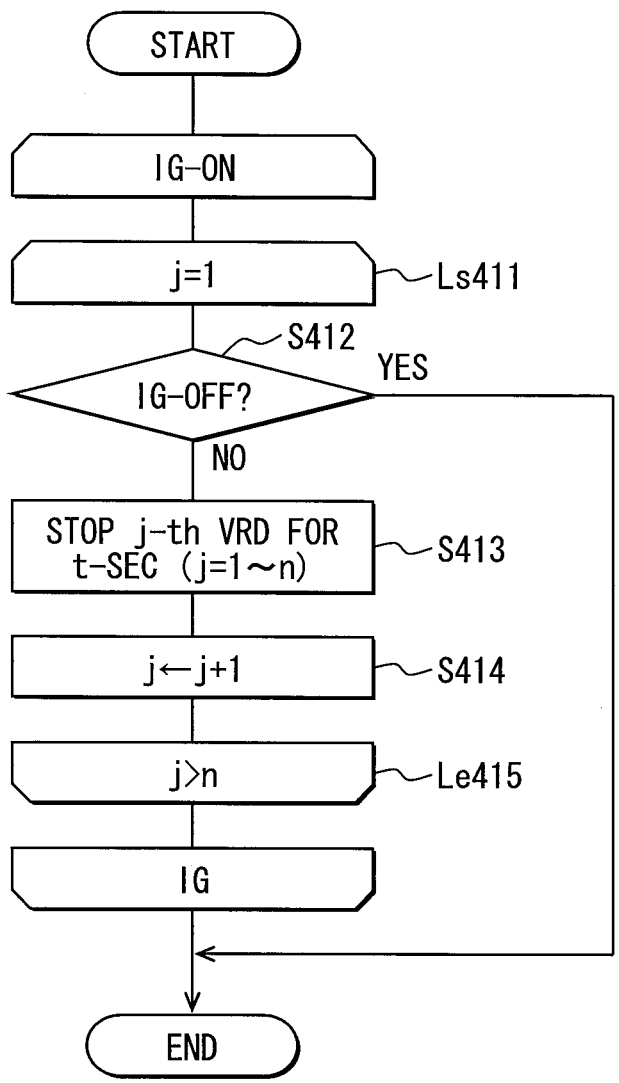
FIG. 14 is a diagram illustrating a flowchart of a sub-process of a voltage-reducing control performed by a voltage-reducing control unit according to the fourth embodiment.

As shown in FIG. 14, after the ignition switch is turned on and while the ignition switch is on (S412: NO), the sorting section 64 successively selects a j-th voltage reducing device (S413, S414) in a process from a loop start Ls411 where "j=1" to a loop end Le415 where "j >n", and the operation of the j-th voltage reducing device is stopped for the time period t, as the i-th voltage reducing device.

Figure 15:
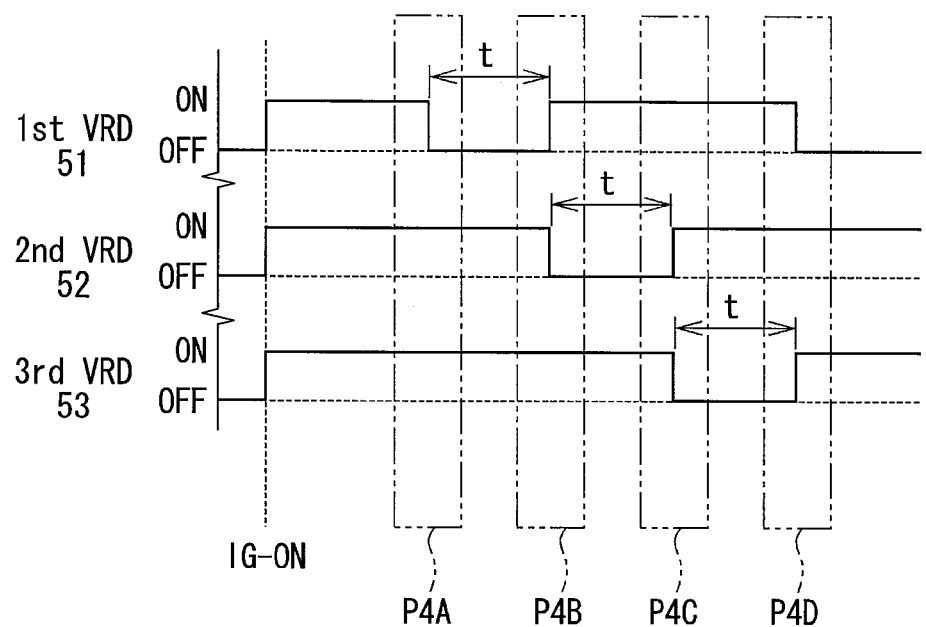
FIG. 15 is a diagram illustrating a time chart of operation states of the voltage-reducing devices in the voltage-reducing control according to the fourth embodiment.

FIG. 15 is a diagram illustrating a time chart of operation and non-operation states of the voltage-reducing devices controlled by the voltage-reducing control of the fourth embodiment, as an example.

When the ignition switch is turned on, all of the three voltage-reducing devices 51, 52, 53 begins operation. At a time P4A, the operation of the first voltage-reducing device 51 is stopped for a time period t.

At a time P4B, the operation of the second voltage-reducing device 52 is stopped for the time period t, and the operation of the first voltage-reducing device 51, which has been stopped, is restarted.

At a time P4C, the operation of the third voltage-reducing device 53 is stopped for the time period t, and the operation of the second voltage-reducing device 52, which has been sopped, is restarted. Thus, the operation stop of the three voltage-reducing devices is successively performed.

At a time P4D, the operation of the first voltage-reducing device 51 is sopped for the time period t again, and the operation of the third voltage-reducing device 53, which has been stopped, is restarted.

Accordingly, the voltage-educing devices are successively stopped, as shown in FIG. 15. Thus, the advantageous effects similar to the third embodiment will be achieved also in the fourth embodiment.

(Fifth Embodiment)

An in-vehicle power supply system according fifth embodiment will be described with reference to FIG. 16.

Figure 16:
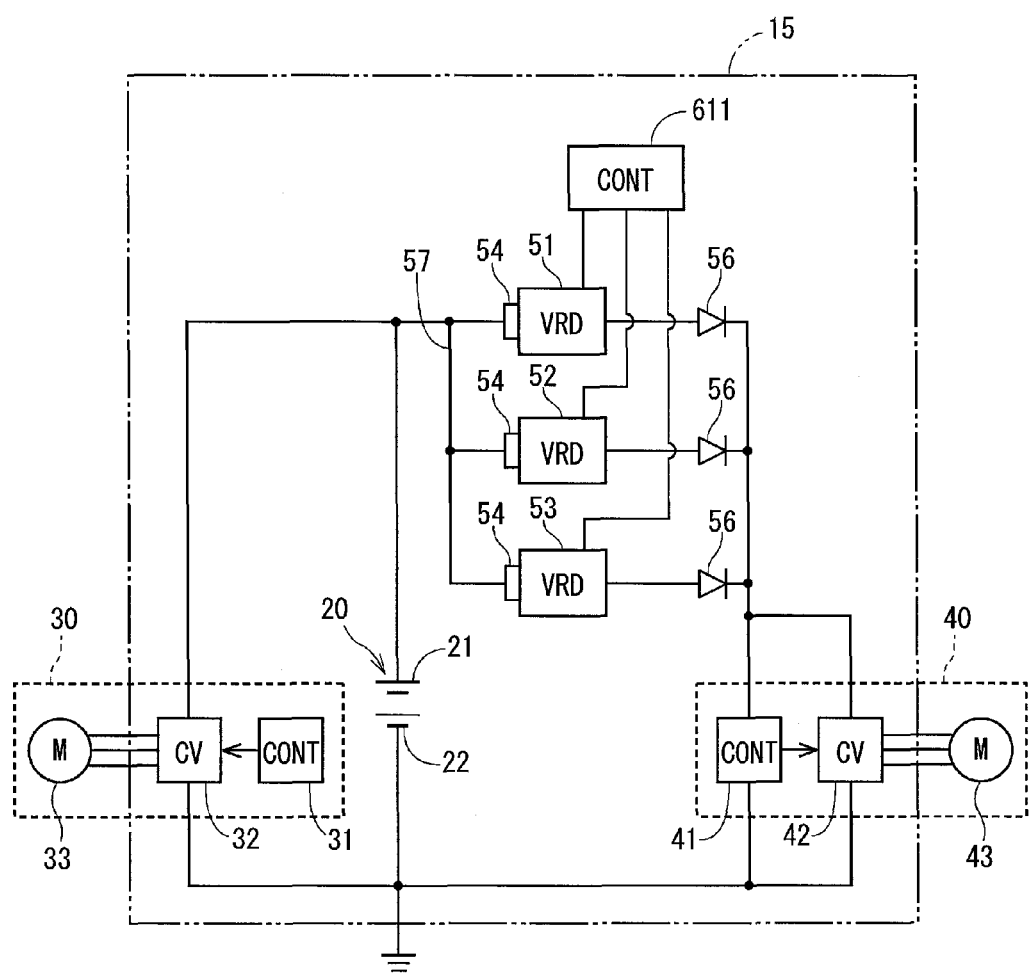
FIG. 16 is a schematic circuit diagram of an in-vehicle power supply system according to a fifth embodiment of the present disclosure.

As shown in FIG. 16, in an in-vehicle power supply system 1 according to the fifth embodiment, the steering drive control unit 41 and the steering power converter 42 are coupled in parallel to each other, at the output side of the voltage-reducing devices 51, 52, 53. Therefore, the steering power converter 42 is supplied with the reduced voltage outputted from the voltage-reducing device 51, 52, 53, in place of the power source voltage of the main battery 20. The operations of the voltage-reducing devices 51, 52, 53 are controlled by the voltage-reducing control unit 611 that is similar to the voltage-reducing control unit 611 of the first embodiment.

In the fifth embodiment, an occurrence of the abnormality in the voltage-reducing devices 51, 52, 53 due to the temperature increase is reduced in the similar manner to the embodiments described above, and the reliability improves. Further, the efficiency of the elements improves.

In the fifth embodiment, the steering power converter 42 is supplied with the reduced voltage. Therefore, the voltage withstand specification of the elements of the steering power converter 42 can be lowered.

(Sixth Embodiment)

An in-vehicle power supply system according to a sixth embodiment will be described with reference to FIG. 17.

Figure 17:
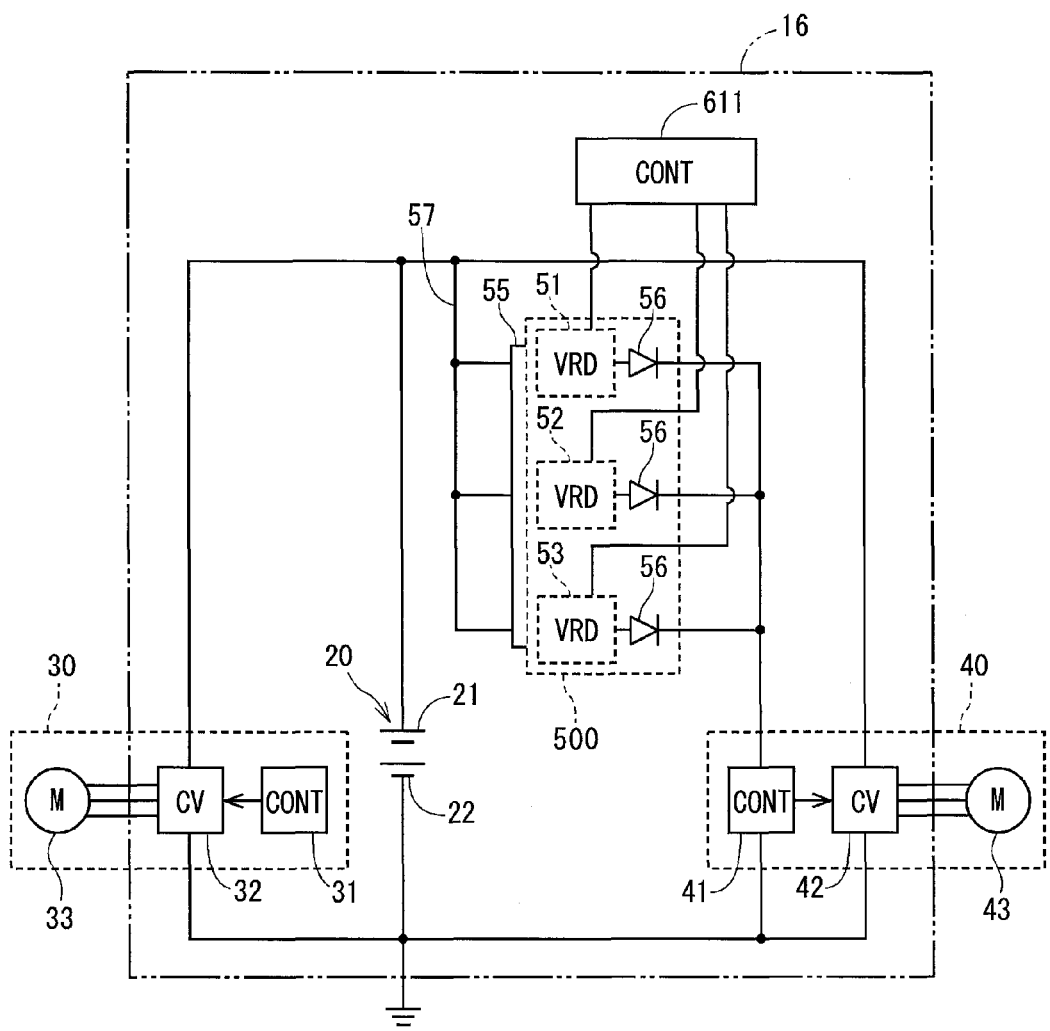
FIG. 17 is a schematic circuit diagram of an in-vehicle power supply system according to a sixth embodiment of the present disclosure.

As shown in FIG. 17, in an in-vehicle power supply system 16 according to the sixth embodiment, the voltage-reducing devices 51, 52, 53 and the diodes 56 are integrated into a module 500 and are coupled to the power line 57 through a common connector 55. Accordingly, even if the voltage-reducing devices are configured as a multiplexed structure, coupling or decoupling works of wirings are eased.

(Other Embodiments)

Figure 18:
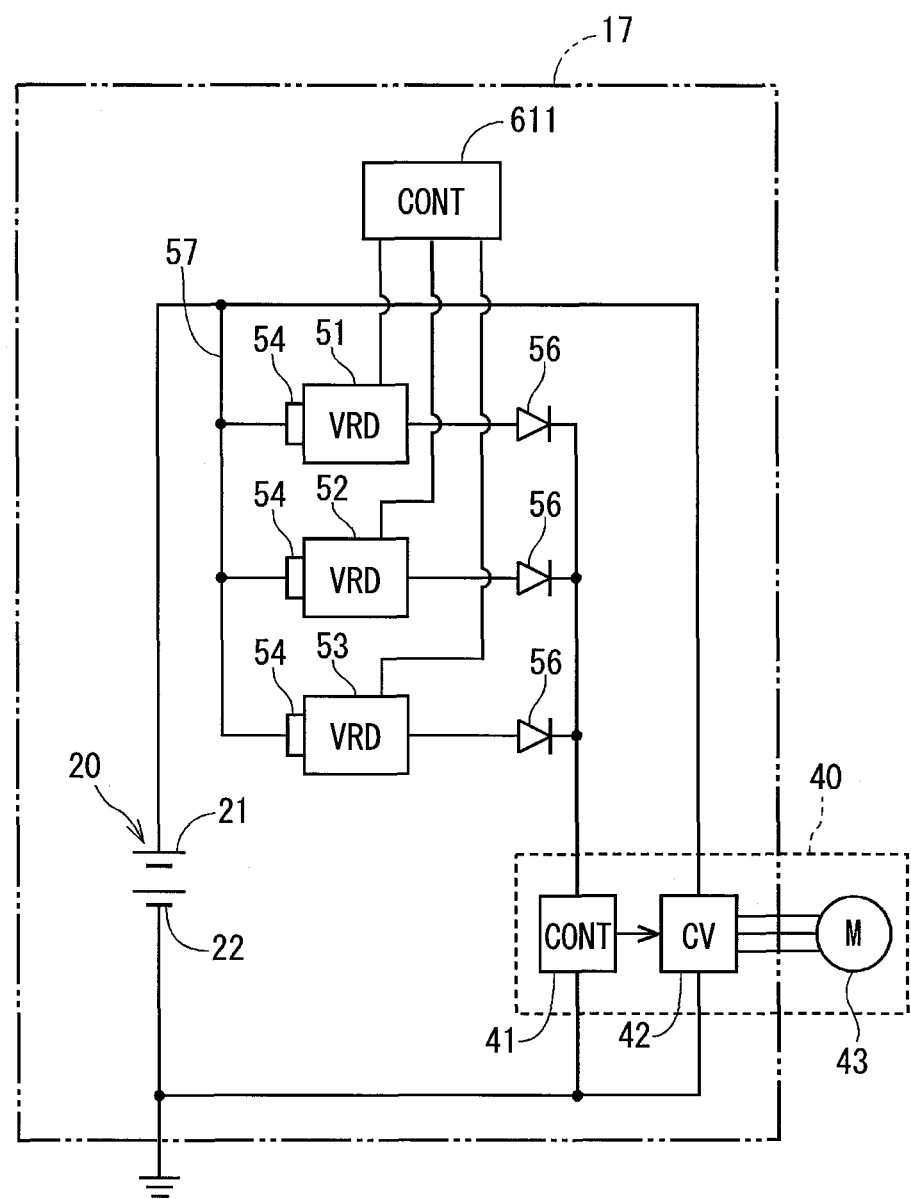
FIG. 18 is a schematic circuit diagram of an in-vehicle power supply system according to another embodiment of the present disclosure.

In the in-vehicle power supply systems of the embodiments described above, the main device 30 and the steering assist apparatus 40 are coupled to the main battery 20 and are coupled in parallel with each other. However, it is not always necessary that the main device 30 is coupled to the main battery 20. For example, in an in-vehicle power supply system 17 shown in FIG. 18, the main device 30 is not coupled to the main battery 20. Namely, the in-vehicle power supply systems according to the present disclosure may be employed to any vehicles, other than the electronic vehicle or the hybrid vehicle.

In-vehicle power supply systems according to the present disclosure, power converters for auxiliary devices other than the main device power converter 32 and the steering power converter 42 may be coupled to the main battery 20 in parallel with the main device power converter 32 and the steering power converter 42. Such auxiliary devices may include a power window device, a blower of an air conditioner, a wiper device, and the like.

The number of the voltage-reducing devices is not limited to three.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An in-vehicle power supply system comprising:
a DC power source;
a steering power converter converting an electric power supplied from the DC power source, and providing the electric power converted to a steering assist motor that assists a steering operation of a vehicle;
a steering drive control unit being supplied with an electric power from the DC power source, and controlling the steering power converter;
a plurality of voltage-reducing devices being coupled in parallel to each other, between the DC power source and the steering drive control unit, each of the voltage-reducing devices reducing a power source voltage of the DC power source to generate a reduced voltage lower than the power voltage when being operated, and
a voltage-reducing control unit determining whether to operate or to stop operation of each of the voltage-reducing devices according to a temperature of each of the voltage reducing devices such that at least one of the voltage-reducing devices is in operation.

2. The in-vehicle power supply system according to claim 1, further comprising:
a main device power converter converting an electric power supplied from the DC power source and providing the electric power converted to a main motor of the vehicle for driving the vehicle; and
a main device drive control unit controlling the main device power converter.

3. The in-vehicle power supply system according to claim 1, wherein
the steering power converter is supplied with the electric power having the power source voltage of the DC power source.

4. The in-vehicle power supply system according to claim 1, wherein
the voltage-reducing devices are respectively coupled to a power line that is supplied with an electric power from the DC power source through individual connectors.

5. An in-vehicle power supply system comprising
a DC power source;
a steering power converter converting an electric power supplied from the DC power source, and providing the electric power converted to a steering assist motor that assists a steering operation of a vehicle;
a steering drive control unit being supplied with an electric power from the DC power source, and controlling the steering power converter;
a plurality of voltage-reducing devices being coupled in parallel to each other, between the DC power source and the steering drive control unit, each of the voltage-reducing devices reducing a power source voltage of the DC power source to generate a reduced voltage when being operated, and
a voltage-reducing control unit determining whether to operate or to stop operation of each of the voltage-reducing devices such that at least one of the voltage-reducing devices is in operation, wherein
the voltage-reducing control unit includes:
an abnormality detection section that detects an abnormality of the voltage-reducing device;
an abnormality determination section that determines whether the abnormality of the voltage-reducing device detected by the abnormality detection section is caused by an increase in temperature; and
a sorting section that sorts the voltage-reducing devices into an operation group and a non-operation group based on a detection result of the abnormality detection section and a determination result of the abnormality determination section,
the sorting section sorts at least one of the voltage-reducing devices into the operation group, and
when the abnormality detection section detects an abnormality in the at least one of the voltage-reducing devices in the operation group and the abnormality determination section determines that the abnormality detected by the abnormality detection section is caused by the increase in temperature, the sorting section sorts the corresponding voltage-reducing device into the non-operation group to stop an operation of the corresponding voltage-reducing device.

6. The in-vehicle power supply system according to claim 5, wherein
the voltage-reducing control unit includes a temperature determination section, and
the temperature determination section detects a temperature of the corresponding voltage-reducing device that has been stopped due to the abnormality caused by the increase in temperature with time, and determines whether the temperature detected is equal to or lower than an allowance threshold temperature.

7. The in-vehicle power supply system according to claim 5, wherein
the sorting section sorts all of the voltage-reducing devices, excluding the voltage-reducing device that has been detected as having the abnormality by the abnormality detection section, into the operation group.

8. An in-vehicle power supply system comprising:
a DC power source:
a steering power converter converting an electric power supplied from the DC power source, and providing the electric power converted to a steering assist motor that assists a steering operation of a vehicle;
steering drive control unit being supplied with an electric power from the DC power source, and controlling the steering power converter;
a plurality of voltage-reducing devices being coupled in parallel to each other, between the DC power source and the steering drive control unit each of the voltage-reducing devices reducing a power source voltage of the DC power source to generate a reduced voltage when being operated, and
a voltage-reducing control unit determining whether to operate or to stop operation of each of the voltage-reducing devices such that at least one of the voltage-reducing devices is in operation, wherein
the voltage-reducing control unit includes:
an abnormality detection section that detects an abnormality in the voltage-reducing devices;
a temperature comparing section that detects a temperature of each of the voltage-reducing devices without having an abnormality and compares the temperatures detected;
a sorting section that sorts the voltage-reducing device having the highest temperature into a non-operation group to stop an operation of the voltage-reducing device and the remaining voltage-reducing devices into an operation group, among the voltage-educing devices without having the abnormality; and
a timing section that detects a predetermined time period to stop the operation of the voltage-reducing device sorted into the non-operation group, wherein
the sorting section sorts the voltage-reducing device in the non-operation group into the operation group such that the operation of the voltage-reducing device is restarted after the predetermined time period elapses.

9. The in-vehicle power supply system according to claim 1, wherein
the voltage-reducing control unit includes an abnormality detection section that detects an abnormality of the voltage-reducing devices,
the voltage-reducing control unit alternately stops an operation of the voltage-reducing devices that are detected not to have an abnormality by the voltage-reducing control unit for a predetermined time period.

10. The in-vehicle power supply system according to claim 1, wherein
the voltage-reducing control unit permits to restart operation of the voltage-reducing device that has been determined to stop the operation according to one of the temperature or a time elapsed from a time the operation of the voltage-reducing device is stopped.

11. The in-vehicle power supply system according to claim 1, wherein
the voltage-reducing control unit detects an abnormality in the voltage-reducing devices due to an increase in temperature, and
the voltage-reducing control unit changes the voltage-reducing device to be operated, among the plurality of the voltage-reducing devices, based on a detection result of the abnormality.

* * * * *